Nov. 9, 1948.  A. BERTEA  2,453,358
ELECTRIC MOTOR
Filed March 7, 1945  4 Sheets-Sheet 1
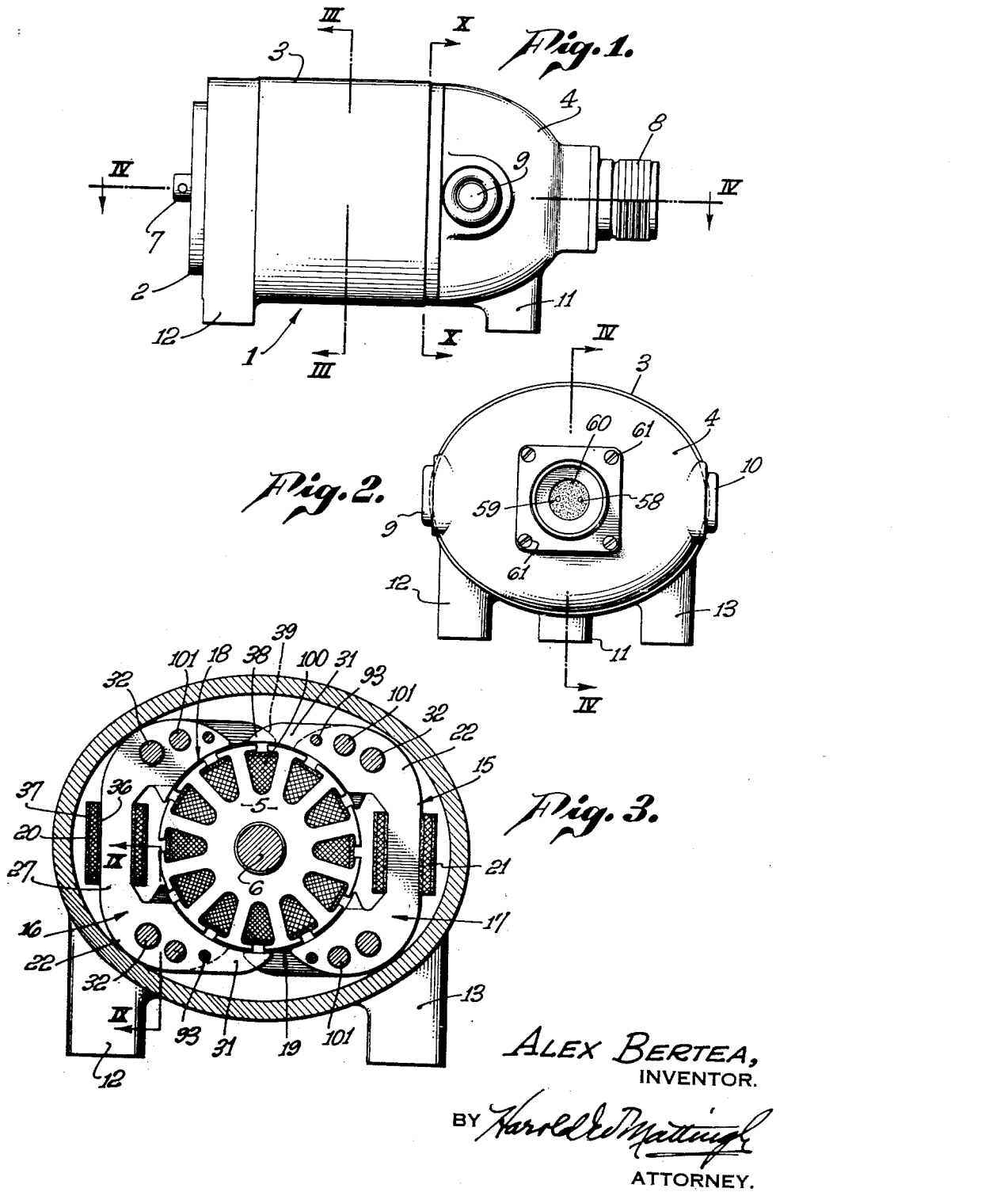
ALEX BERTEA,
INVENTOR.
BY
ATTORNEY.

Nov. 9, 1948.  A. BERTEA  2,453,358
ELECTRIC MOTOR
Filed March 7, 1945  4 Sheets-Sheet 2
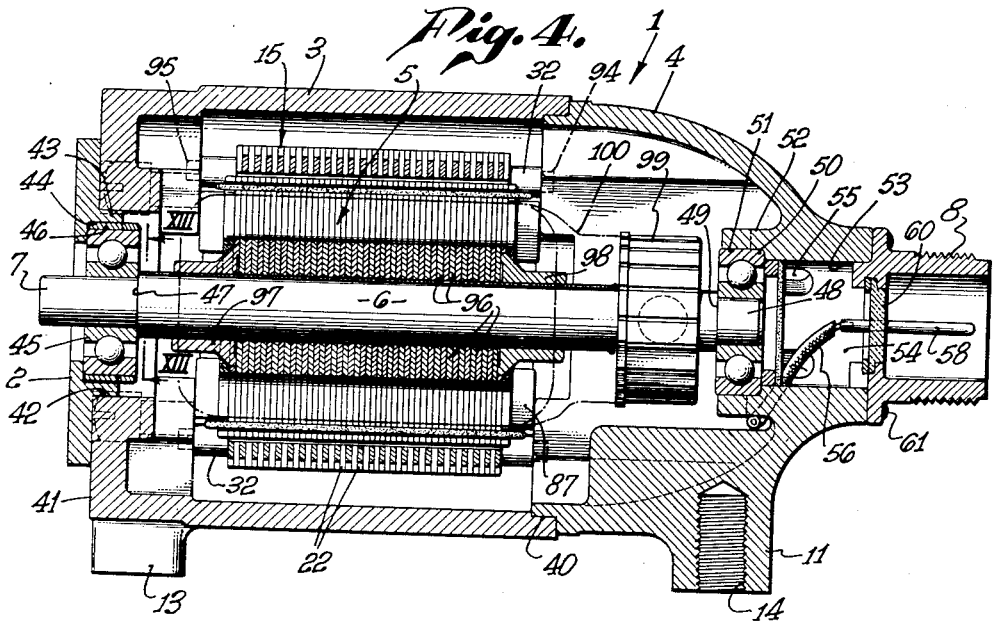
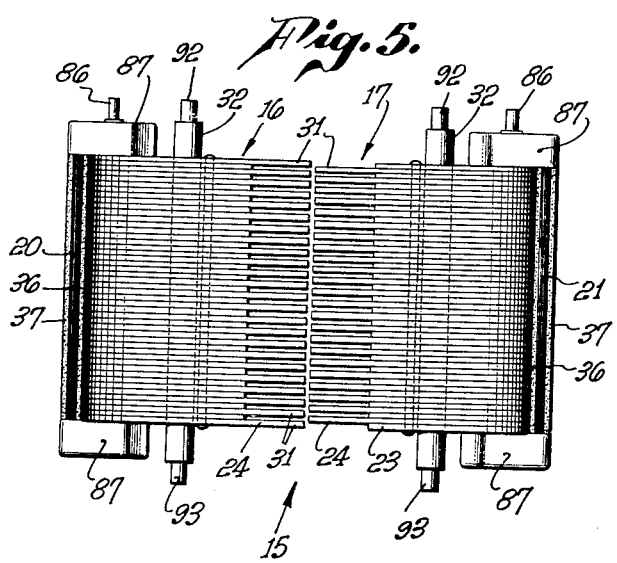
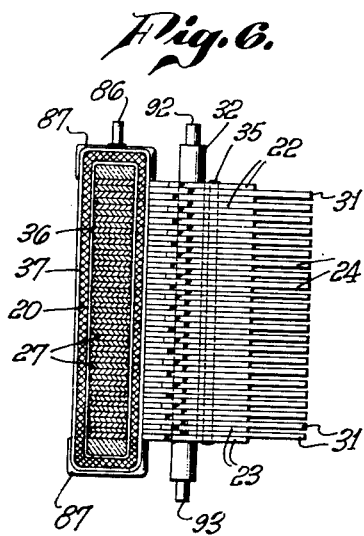
ALEX BERTEA,
INVENTOR.
BY Harold R. Mattingly
ATTORNEY.

Nov. 9, 1948.　　　　　　　A. BERTEA　　　　　2,453,358
　　　　　　　　　　　　ELECTRIC MOTOR
Filed March 7, 1945　　　　　　　　　　　　　4 Sheets-Sheet 3
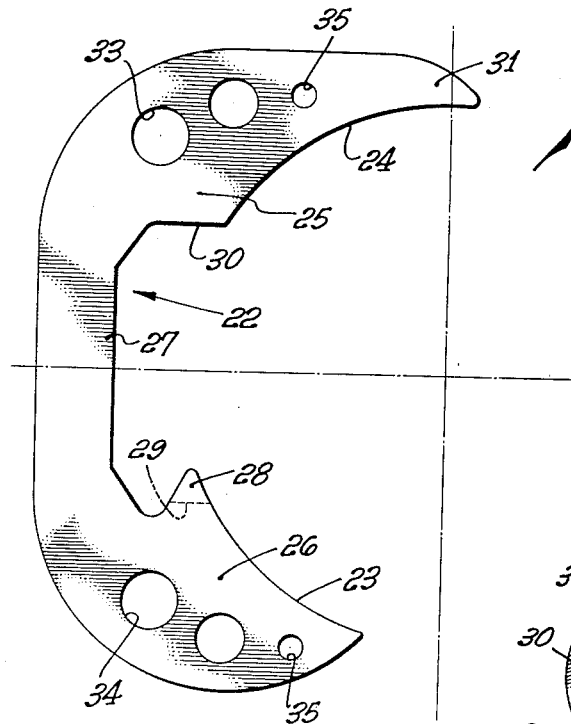
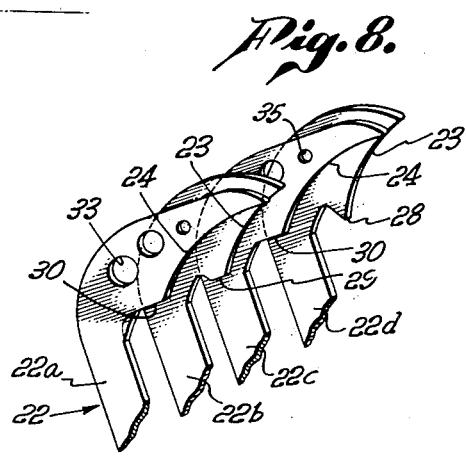
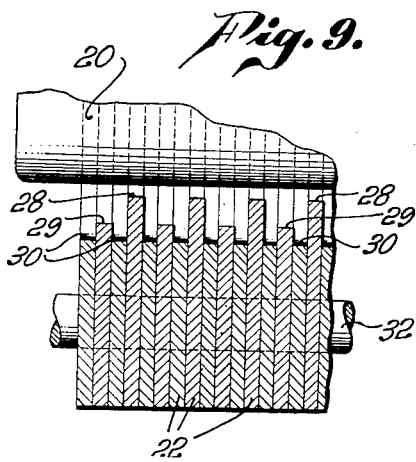
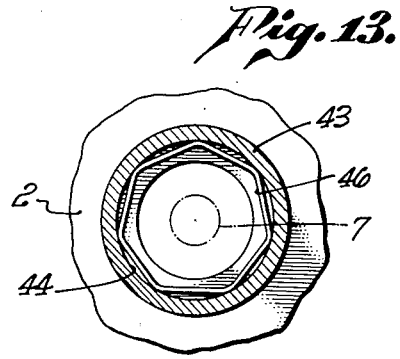
ALEX BERTEA,
INVENTOR.
BY
ATTORNEY.

Nov. 9, 1948.  A. BERTEA  2,453,358
ELECTRIC MOTOR
Filed March 7, 1945  4 Sheets-Sheet 4

ALEX BERTEA, INVENTOR.
BY Harold W. Mattingly
ATTORNEY.

Patented Nov. 9, 1948

2,453,358

UNITED STATES PATENT OFFICE 2,453,358

ELECTRIC MOTOR

Alex Bertea, Pasadena, Calif.

Application March 7, 1945, Serial No. 581,420

4 Claims. (Cl. 172—36)

My invention relates to electric motors and has particular reference to a novel field construction which permits the realization of greatly increased overall efficiency over that which can be realized with conventional field constructions. The invention has particular utility when applied to small electric motors of the character used on aircraft.

In certain applications of small electric motors, it is necessary that the physical size and weight of the motor be kept to a minimum. A typical example of such an application is in the use of small electric motors on aircraft for the operation of fuel pumps, pumps for de-icing fluid and motors for operating cowl flaps, trim tabs and the like. In applications such as this, the realization of a high efficiency in a small electric motor is of considerable importance since it permits a smaller and lighter weight motor to be used to deliver the required amount of power. The improvement in efficiency also results in a reduced system load with the result that a considerable saving may be effected in the size and weight of the batteries or generating equipment used to supply power for the electrical system.

It is an object of my invention to provide an electric motor which has a substantially improved efficiency through the use of a novel construction of the main field assembly.

It is also an object of my invention to improve the efficiency of an electric motor by reducing to a minimum the flux cancellation in the armature and by utilizing to the maximum advantage the repulsive and attractive forces between the armature poles and the field poles.

It is also an object of my invention to provide an electric motor of the character set forth in the preceding paragraphs which includes a novel field construction having pole face members which are serrated at their edges to provide a graduated repulsive and attractive effect, thereby permitting an increased pole face span.

It is an additional object of my invention to provide in a motor of the character set forth hereinbefore a novel field construction which includes an increased reluctance section in the center of the span of the field pole face to reduce to a minimum the flux cancellation in the armature.

In the manufacture and servicing of electric motors, a great deal of time is consumed in disassembling and assembling the motor. Assembly and disassembly operations are ordinarily complicated by the presence of lead wires which connect the brushes or brush holders with the main field requiring these wires to be disconnected before the brush carrying end bell can be separated from the remainder of the structure. Also difficulty is often encountered in re-establishing the required alignment of the bearings which are mounted in the end bells.

It is, therefore, an additional object of the present invention to provide an electric motor which overcomes the above noted disadvantages by including a novel mechanism for providing an electrical interconnection between the field windings and the brush holders.

It is also an object of my invention to provide in a motor of the character set forth in the preceding paragraph a novel field construction which greatly simplifies the operation of winding the field coils and which materially facilitates the assembly of the motor:

It is an additional object of my invention to provide an electric motor of the character described in which all of the lead wires are mounted in the brush holder end bell so that the end bell may be removed without requiring disconnection of wires or interconnecting leads.

Other objects and advantages of my invention will become apparent from a study of the following specifications, read in connection with the accompanying drawings, wherein:

Fig. 1 is a side elevational view of a small electric motor constructed in accordance with the preferred embodiment of my invention;

Fig. 2 is an end elevational view of the motor illustrated in Fig. 1;

Fig. 3 is a cross sectional view taken substantially along the line III—III of Fig. 1;

Fig. 4 is a longitudinal sectional view taken substantially along the lines IV—IV of Figs. 1 and 2;

Fig. 5 is an exploded plan view showing the two halves of the field structure separated prior to assembly;

Fig. 6 is a longitudinal sectional view through one of the field structure halves which are shown in Fig. 5;

Fig. 7 is a side elevational view illustrating the form of stampings used in assembling the field structure;

Fig. 8 is a fragmentary exploded perspective view showing the stacking arrangement used in laminating the field structure;

Fig. 9 is a fragmentary view taken as indicated by the line IX—IX of Fig. 3 and showing the arrangement of teeth used on the peripheral edges of the pole faces;

Fig. 13 is a fragmentary sectional view taken substantially along the line XIII—XIII of Fig. 4 and illustrating the construction of the front bearing retainer.

Figure 10:
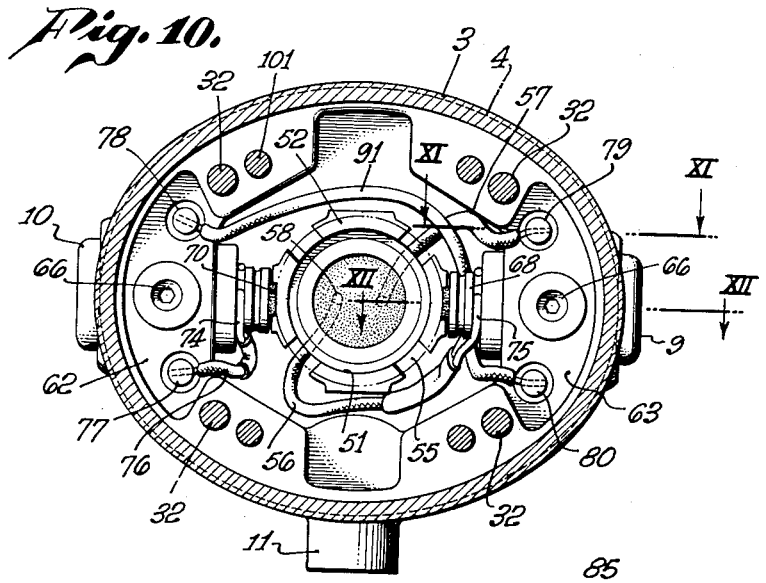
Fig. 10 is a cross sectional view taken substantially along the line X—X of Fig. 1.

Referring to the drawings, I have illustrated in Fig. 1 the preferred embodiment of my invention as comprising an electric motor 1 which consists of a front end bell 2, a main housing 3 and a rear end bell 4. Between the bells 2 and 4 and within the housing 3 there is mounted an armature 5 which is supported upon a shaft 6, one end 7 of which protrudes through the end bell 2 to permit connection to an apparatus to be operated by the motor. The end bell 4 preferably carries a suitable terminal or plug 8 by means of which electric power may be conveyed to the motor and also mounts brush holders 9 and 10. The end bell 4 may carry a mounting foot 11 and the forward end of the main frame 3 may be provided with a pair of similar feet 12 and 13. This provides a three-point support for the motor, allowing it to be firmly secured to any plane surface. To this end the feet 11, 12 and 13 are preferably bored and tapped as indicated at 14 in Fig. 4.

Within the main frame 3 there is mounted a field structure 15 seen in cross section in Fig. 3 and in longitudinal section in Fig. 4. The field structure 15 is formed of separable halves 16 and 17 which, when assembled, define a field structure which completely encircles the armature 5 and provides a pair of oppositely disposed pole faces 18 and 19. About the halves 16 and 17 there are wound field coils 20 and 21. The halves 16 and 17 are similar in shape and arrangement and are generally C-shaped. They comprise a plurality of laminations 22 which are formed as shown in Fig. 7 and stacked as indicated in Figs 8 and 9.

Each of the laminations 22 includes oppositely positioned arcuate pole face portions 23 and 24, the portion 23 being somewhat shorter than the portion 24. These pole face portions are joined by leg portions 25 and 26 to a central portion 27, the sides of which are substantially parallel and disposed substantially at right angles to the leg portions 25 and 26. The laminations 22 are of two types and differ only in the length of the short arcuate pole face section 23. One set of laminations is formed with a relatively sharp pointed tooth portion 28 at the inner end of the arcuate portion 23 as shown by solid lines in Fig. 7. The alternate set of laminations differs in that the two portions are cut off along the dotted line 29 shown in Fig. 7.

The laminations are stacked as shown in Fig. 8. The first lamination which is placed in the stack (22a in Fig. 8) may be of the type which is cut along the line 30 of Fig. 7. This lamination is placed with the long pole face portion 24 at the top as viewed in Fig. 8. The next lamination (22b) may comprise a lamination cut along the dotted line 29 in Fig. 7 but placed in reverse position so that the short pole face portion 23 is at the top. The third lamination (22c) is identical with 22a and is placed with its long pole face portion 24 at the top as viewed in Fig. 8. The fourth lamination may comprise one of the type shown in Fig. 7 as having a sharp inner corner 28 but is placed in reverse position so that the sharp pointed portion 28 and the short arcuate pole face portion 23 are at the top as shown in Fig. 8. The fifth lamination is the same as the first and the sixth is the same as the second, and so forth.

When this arrangement of laminations is employed, the portions of the pole faces adjacent each other (i. e., nearest the field windings 20 or 21) present a toothed or serrated aspect as is illustrated in Fig. 9 comprising long teeth 28 (so identified because they are defined by the pointed portions 28 of the laminations) with teeth of intermediate length 29 defined by the portions cut along the dotted line 29 of Fig. 7, and positioned alternately with respect to the long toothed portions 28. Between each of the members 28 and 29 there are positioned laminations identified in Fig. 9 by the reference character 30, the portions 30 being defined by a straight inside surface 30 of the leg portion 25 of the lamination 22 shown in Fig. 7.

The laminations are stacked upon assembly dowels 32 which are passed through dowel receiving bores 33 and 34. When stacked, the laminations are secured to each other by means of small rivets 35 which are passed through the complete stack.

The central parallel sided portions 27 of the stacked laminations define a parallel sided solid upon which the field windings 20 or 21 are wound. The windings are insulated from the laminations 22 as by means of an inner layer 36 of insulating material and are preferably protected on the outside by an exterior layer 37 of insulating material. The windings 20 and 21 are applied before the two field structure halves are joined. By so doing the windings 20 and 21 may be put on by a coil winding machine, it being only necessary to provide suitable supporting fixtures for rotating the U-shaped structure about an axis passing through the center of the central portion 27.

The alternate stacking of the laminations as previously described provides at the outer ends of the pole face portions a plurality of transversely extending fingers 31 which are spaced axially of each other by the thickness of a single lamination due to the intervening laminations which are stacked with the short pole face portions 23 adjacent the long pole face portions 24. When the two field structure halves 16 and 17 are to be assembled to form the completed field structure, they are placed opposite each other as shown in Fig. 5 with the fingers 31 of one half positioned opposite the space between adjacent fingers of the other half. The two halves are then moved toward each other to the relative positions shown in Fig. 3. In this position the arcuate pole face portions 23 and 24 of both halves 16 and 17 lie on a circular cylinder which is slightly larger in diameter than the outside diameter of the armature 5.

It will be noted in Fig. 3 that the fingers 31 defined by the long pole face portions 24 overlap as indicated by the solid line 38 and the dotted line 39 in Fig. 3. This overlapping portion has an arcuate width of approximately one-third the span between oppositely positioned short pole face portions 23. Thus the overlapping portion comprises a section which is axially continuous and which is flanked on either side by sections which consist of an alternate arrangement of laminations and air spaces the thickness of a single lamination. Thus, there is provided in the center of each field pole a low reluctance section flanked on either side by a section of somewhat higher reluctance and of limited arcuate length.

In devising the field structure just described, recognition has been given to the fact that the forces producing a torque tending to rotate the armature are due principally to magnetic attraction and repulsion between, respectively, unlike and like armature and field poles rather than due to the effect of a current flowing in an armature conductor which is situated in a magnetic field. Recognition is also given to the fact that the armature poles of greatest strength are those which are in line with the brushes; that is, positioned midway between opposite field pole faces. It is therefore desirable to extend the arcuate span of the field pole face to as close a proximity as is possible with the strongest armature pole. This is done in the above described construction by the tooth portions 28 and 29 described in connection with Fig. 9. The tooth construction is employed in preference to extending the entire pole face as by so doing it is possible to avoid impairing the accommodation of armature poles that are spread farther apart since there is provided at the shorter teeth 29 and at the still shorter portions 30 additional rows of field pole heels. This permits utilization to the greatest extent of the maximum armature pole strength and also serves to blend out and reduce to a minimum the torque unbalance produced by the entering of an armature pole face under the heel of the field pole. There is thus produced a torque smoothing effect similar to that which may be obtained by the employment of skewed armature slots while avoiding the reduction in effective armature winding space which accompanies a skewing of the armature construction. The teeth also maintain a substantially constant attractive and repulsive force between the entering armature pole and the leaving armature pole, respectively, thus exerting a maximum torque over a maximum arcuate span.

The overlapping central portion 38—39 and the higher reluctance portions which extend axially along either side of the central portion function to reduce to a minimum the short circuiting effect provided by the conventional solid pole face construction as regards the magnetic path between adjacent armature poles which are positioned at right angles to the brush axis. The pole face thus operates in part as though the poles were magnetically separate, avoiding a back attraction as the armature magnetic polarity reverses and affording a maximum repulsive effect as soon as the armature polarity has been reversed.

By winding the field windings 20 and 21 directly upon the field structure instead of merely around the field pole piece as is the conventional form of construction, there is obtained a considerable increase in the efficiency of the field winding itself. With the form of winding described, the length of the non-working end turns are reduced to a negligible fraction of the entire winding length, whereas in conventional constructions the major portion of the winding is used in the end connections.

The main frame 3 is of tubular form to receive the field structure 15 and is by preference provided with an elliptical or oval cross section, as is best shown in Fig. 3, to make the most economical use of the space within which the laterally elongated field structure 15 is placed. The abutting end of the end bell 4 is shaped to conform to the shape of the main frame 3 and a shouldered lap joint, as is indicated at 40 in Fig. 4, maintains the required alignment between the end bell 4 and the main frame 3. The main frame 3 is closed at its forward end by a radially extending portion 41 which is in turn bored as shown at 42 to receive a boss 43 formed on the front end bell 2. The end bell 2 is counterbored as indicated at 44 to receive a suitable anti-friction bearing 45 shown as comprising a ball bearing within which is rotatably supported the armature shaft 6. The bearing 45 is by preference slipped into the counterbore 44 while the shaft end 7 fits the inner race of the bearing 45 with a press fit. The bearing 45 is frictionally held in the counterbore 44 by means of a polygonal spring retainer 46 shown in detail in Fig. 13. The retainer 46 may be formed of a strip of flat spring material such as spring brass or phosphor bronze. The counterbore 44 is made enough larger than the outside diameter of the bearing 45 to permit the bearing 45 and the spring retainer 46 to both be placed within the counterbore 44. In placing the bearing 45 in the counterbore and within the retainer 46, the latter is deformed from its normal polygonal shape to a substantially circular shape, its resilient tendency to restore to the polygonal shape serving to frictionally grip the outer race of the bearing 45 and hold the same within the counter bore in the end bell 2.

The shaft 6 is radially shouldered as indicated at 47 to limit endwise movement of the shaft 6 to the left as viewed in Fig. 4. Similarly, at the extreme right-hand end of the shaft 6, there is provided a reduced diameter portion 48 forming a shoulder 49. Upon the reduced diameter portion 48 there is pressed an anti-friction bearing 50 to engage the shoulder 49 and limit endwise movement of the shaft 6 to the right as viewed in Fig. 4. The outer race of the bearing 50 is slidably received within a counterbore 51 formed in an internal boss 52 carried by the end bell 4. The bore 51 is extended at a reduced diameter as shown at 53 completely through the end bell 4 to provide an interior space 54 for accommodating electrical connections. The boss 52 is axially slotted as indicated at 55 to divide the boss 52 into a plurality of fingers which, by virtue of the resilience of the metal and the fact that the counterbore 51 is provided with a normal diameter less than the outside diameter of the bearing 50, serve to provide a spring gripping action, by means of which the bearing 50 is removably retained within the counterbore 51.

The interior space 54 accommodates electrical connections which may comprise electric wires 56 and 57 which are suitably secured as by soldering to a pair of terminal pins 58 and 59 which are mounted in an insulating support 60 carried by the connector 8. The connector 8 may be secured to the end bell 4 as by means of a plurality of screws or rivets 61. The electric wires 56 and 57 are passed through the slot 55 and connected in a manner to be described hereinafter.

Figure 12:
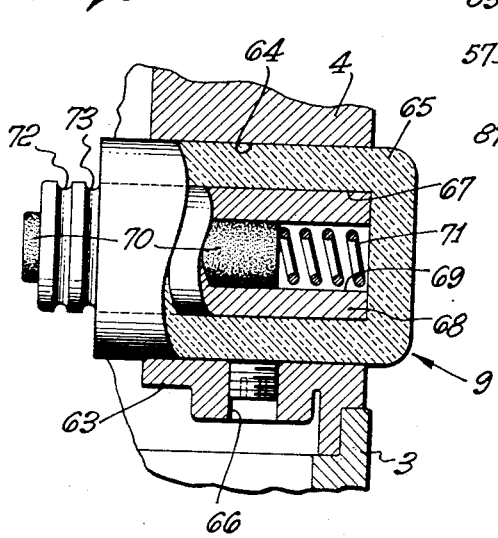
Fig. 12 is a fragmentary sectional view taken substantially along the line XII—XII of Fig. 10.

The end bell 4 serves to also support the brush holders 9 and 10. This support is provided by a pair of bosses 62 and 63 (Figs. 10 and 12) which are transversely bored as indicated at 64 to receive a cup-like brush holder 65 formed of insulating material. The holder 65 is locked in the bore 64 as by means of a set screw 66. The insulator 65 is provided with an inner bore 67 within which is fitted a tubular contact member 68. The contact member 68 is bored as at 69 to receive a brush 70 formed of carbon or other suitable brush material. The brush 70 is urged inwardly toward the shaft 6 as by means of a compression spring 71 enclosed within the bore 69 and bearing at one end against the end of the brush 70 and at the other end against the bottom of the hole 81 in the insulator 85. The innermost end of the contact member 68 is provided with a pair of annular grooves 72 and 73 of semi-circular cross section which serve to receive spring clip terminal such as are shown at 74 and 75 in Fig. 10. The terminal 75 is connected to the previously mentioned conductor 56 while the clip 74 is secured to a field supply conductor 76. The conductor 76 is connected to a contact member 77.

Figure 11:
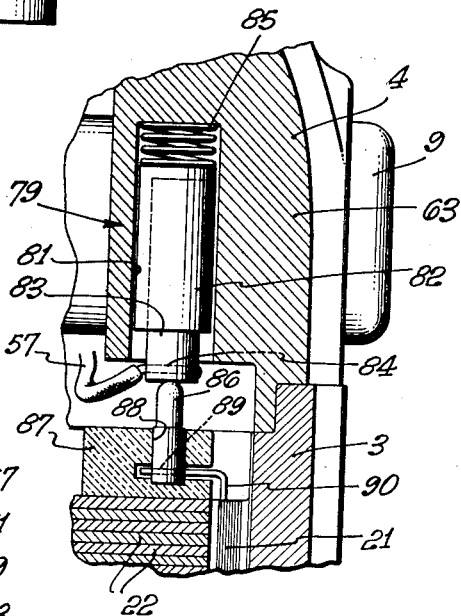
Fig. 11 is a fragmentary sectional view taken substantially along the line XI—XI of Fig. 10.

The assembly to be described employs four such contact members identified in Fig. 10 by the reference characters 77, 78, 79 and 80. These contact members are identical and are constructed as shown in Fig. 11. As is shown therein, the end bell boss 83 is bored as indicated at 81 to slidably receive an insulating member 82. The insulating member carries a metallic contact member 83 to which the conductor 57 is electrically connected as by being passed through a small transversely extending bore 84 and being soldered or otherwise suitably secured therein. A compression spring 85 interposed between the insulator 82 and the bottom of the bore 81 resiliently urges the metallic member 83 into contact with a corresponding field terminal member 86. The field terminal members are mounted upon the field structure halves 16 and 17 in positions to engage the contacting members 77—80 when the motor is assembled as shown in Fig. 4. The terminal members 86 are mounted in insulating caps 87 which are placed over the ends of the field windings 20 and 21 as is shown in Figs. 5 and 6. The terminal members 86 are pressed into a suitable bore 88 formed in the caps 87 and are themselves transversely bored as indicated at 89 to receive the end of a field winding conductor 90. The conductor 90 may be secured in the pin as by soldering or as by deforming the end of the pin so as to securely clamp the wire within the bore 89. Two of the terminal pins are provided for each of the coils 20 and 21, the terminals being connected to opposite ends of each coil.

When the field structure is assembled within the main frame 3 and the end bell is placed in position as is shown in Fig. 4, the electrical circuit of the motor is completed to place the two field windings in series with the armature across the input terminals 58 and 59. The additional electrical connections include a conductor 91 extended between the field terminal connectors 78 and 80 and the aforementioned conductor 57 which is connected to the field terminal connector 79.

It will be noted that all of these interconnections are between structures mounted within the end bell 4 so that removal of the end bell 4 is permitted without requiring any of the electrical connections to be disturbed. This operation is permitted by employing the spring connectors 77 to join the field structures electrically to the brushes and terminals mounted in the end bell 4.

The assembly dowels 32 previously mentioned in the description of the field structure serve also to rotate the field structure within the motor frame when the motor is assembled. The dowels are all identical and consist of a length of cylindrical rod terminated at each end by smaller diameter portions 92 and 93. These smaller diameter portions are received in suitable pockets 94 and 95 formed in bosses on the front end of the main frame 3 and in the end bell 4. These pockets are so positioned that when the reduced diameter portions 92 and 93 are received therein, the field structure halves 16 and 17 will be spaced from each other the proper distance to define a circular bore within which the armature may rotate. Also the length of the dowels 32 between the shoulders adjacent the reduced diameter portions is adjusted to hold the main frame 3 and the end bell 4 in the proper spaced relation.

The armature is preferably constructed as shown in Fig. 4 and comprises a series of laminations 96 which are stacked on the shaft 6 and held in place by means of collars 97 and 98 placed on the shaft. The rear end of the shaft mounts a commutator 99 which is connected in a conventional manner to armature windings 100 (Fig. 3) disposed within triangular armature slots defined by the star-shaped armature laminations 96.

In assembling the motor, the field structure is placed within the main frame 3 with the assembly dowels engaging the pockets 95. The armature is installed with the front end bearing 45 placed within the counterbore 44. The rear end bell 4 is then slipped into place with the assembly dowels being received within the pockets 94. When the parts are thus assembled, they are held together by means of four longitudinally extending screws 101 which are recessed within the end bell 2 and passed through suitable apertures provided in the field structure halves 16 and 17 and threaded into bosses formed in the end bell 4. With this construction the entire motor may be disassembled by removing the four screws 101 and reversing the assembly procedure. The field structure after removal may be divided into halves as is shown in Fig. 5 and the field circuits may be independently checked and rewound with ease if rewinding is required. Upon reassembly, the parts can go together only in one way and when they are assembled in that fashion, they are automatically positioned in their required locations.

From the foregoing it will be observed that I have provided an electric motor construction which is characterized by the employment of a new and novel type of field structure. Attention is directed particularly to the teeth or serrations which are formed on the peripheral edges of the field poles and also to the screened or increased reluctance at the center of the field poles, these improvements serving to provide a material increase in the overall efficiency of the motor. As an example, comparative efficiency tests were made with a commercially obtained motor using, on the one hand, the conventional field structure with which the motor was factory equipped and, on the other hand, a field structure of the character described hereinbefore. In making the tests all test conditions were maintained constant, the sole difference between the two tests being the substitution of my improved field for the conventional field furnished with the motor. The tests showed that by substituting my new field for the commercial field raised the maximum efficiency from 47% at 81 watts input to 70% at 72 watts input and 67% at 81 watts input, an increase in efficiency of nearly 50%.

Attention is directed also to the ease with which the motor of my invention is disassembled and re-assembled, and particularly to the manner in which the electrical connections are made to the field structure to facilitate initial manufacture and repair operations.

While I have shown and described the preferred embodiment of my invention, I do not desire to be limited to any of the details of construction shown or described herein, except as defined in the appended claims.

I claim:
1. In an electric motor, a field structure comprising a first plurality of laminations having an asymmetrical C-shape, the legs of said C-shape terminating in arcuate portions of given lengths all lying on the surface of a circular cylinder, a second plurality of laminations having an asymmetrical C-shape, the legs of said C-shape terminating in arcuate portions of lengths different from the given lengths of the first plurality and all lying on the surface of said circular cylinder, said first and second pluralities of laminations being arranged to define a plurality of circumferentially extending teeth spaced along the axial edges of said arcuate portions.

2. In an electric motor, a field structure comprising a pair of separable halves, each of said halves consisting of a plurality of stacked laminations having an asymmetrical C-shape with one of the legs of said C-shape longer than the other, said laminations being alternately stacked with the long leg of one lamination placed upon the short leg of an adjacent lamination, the legs of said C-shape all terminating in arcuate portions lying on the surface of a circular cylinder, the long legged laminations of one of said halves being placed between the long legged laminations of the other of said halves to define an axially extending central pole face portion flanked on each side by a plurality of axially spaced and radially extending perforations.

3. In an electric motor, the combination of: a tubular main frame with end bells; an armature in said frame rotatably supported on said end bells; a field structure surrounding said armature, said field structure comprising a pair of separable halves each consisting of a plurality of stacked laminations, said laminations having an asymmetrical U-shape with one of the legs of said U-shape being longer than the other, said laminations being stacked alternately to provide a plurality of outwardly extending fingers immediately adjacent the armature and separated from each other by the thickness of the intervening lamination; and support means engaging one of said end bells mounting said halves in said frame and normally supporting said halves with the outwardly extending fingers of one half disposed between the corresponding fingers of the other half.

4. In an electric motor, a field structure comprising a pair of separable halves, each of said halves consisting of a plurality of stacked laminations having an asymmetrical U-shape with one of the legs of said U-shape longer than the other, said laminations being alternately stacked with the long leg of one lamination placed upon the short leg of an adjacent lamination, the legs of said U-shape all terminating in arcuate portions lying on the surface of a circular cylinder, and means for interengaging said laminations and securing said stacked laminations to each other into a unitary structure.

ALEX BERTEA.

REFERENCES CITED

The following references are of record in the file of this patent:

UNITED STATES PATENTS

| Number | Name | Date |
|---|---|---|
| 451,574 | Rice | May 5, 1891 |
| 724,484 | Meston | Apr. 7, 1903 |
| 1,220,486 | Amsler | Mar. 27, 1917 |
| 1,314,132 | Dorsey | Aug. 26, 1919 |
| 1,424,164 | Hoover | Aug. 1, 1922 |
| 1,488,498 | Hoff | Apr. 1, 1924 |
| 1,495,827 | Warren | May 27, 1924 |
| 1,750,122 | Oswald | Mar. 11, 1930 |
| 2,158,145 | Oster | May 16, 1939 |
| 2,185,990 | Schurch | Jan. 2, 1940 |
| 2,230,008 | Nowosielski | Jan. 28, 1941 |
| 2,251,673 | Gillen | Aug. 5, 1941 |
| 2,274,480 | Jepson | Feb. 24, 1942 |
| 2,332,126 | Allen | Oct. 19, 1943 |
| 2,402,380 | Dicke | June 18, 1946 |

FOREIGN PATENTS

| Number | Country | Date |
|---|---|---|
| 606,021 | Germany | Nov. 23, 1934 |